United States Patent [19]

Schwuchow et al.

[11] Patent Number: 4,900,082
[45] Date of Patent: Feb. 13, 1990

[54] FRONT SECTION FOR A MOTOR VEHICLE, ESPECIALLY A PASSENGER MOTOR VEHICLE

[75] Inventors: Norbert Schwuchow; Gerhard Burk, both of Sindelfingen, Fed. Rep. of Germany

[73] Assignee: Daimler-Benz AG, Stuttgart, Fed. Rep. of Germany

[21] Appl. No.: 210,980

[22] Filed: Jun. 24, 1988

[30] Foreign Application Priority Data

Jun. 24, 1987 [DE] Fed. Rep. of Germany ....... 3720847

[51] Int. Cl.$^4$ ............................................. B62D 25/08
[52] U.S. Cl. .................................................... 296/194
[58] Field of Search ........................ 296/194, 192, 204

[56] References Cited

U.S. PATENT DOCUMENTS

| 4,391,465 | 7/1983 | Piano | 296/194 |
| 4,466,653 | 8/1984 | Harasaki | 296/194 |
| 4,469,368 | 9/1984 | Eger | 296/194 |
| 4,750,780 | 6/1988 | Harasaki et al. | 296/192 |

FOREIGN PATENT DOCUMENTS 2725083 12/1978 Fed. Rep. of Germany .
2841988 4/1980 Fed. Rep. of Germany .
2847679 5/1980 Fed. Rep. of Germany .

Primary Examiner—Robert R. Song
Attorney, Agent, or Firm—Barnes & Thornburg

[57] ABSTRACT

A front section for a motor vehicle, especially passenger motor vehicle which has the task during normal driving operation to absorb without permanent deformation the forces stemming from the wheel suspension and to absorb by deformation the energy occurring in case of an impact of the vehicle. The front section according to the invention should be manufacturable cost-favorably and rationally with a small number of parts and is to offer a high safety for the vehicle passengers. The end wall of the front section is thereby divided horizontally into an upper part and a lower part, and the fork bearer is made of an upper shell and of a lower shell while one shell of the fork bearer is made in one piece with the lower part of the end wall. The front section made in this manner offers additionally a high degree of safety for the vehicle passengers in the passenger cell and is suited especially for passenger motor vehicles in which longitudinal bearers are supported at an end wall by way of fork bearers.

11 Claims, 5 Drawing Sheets

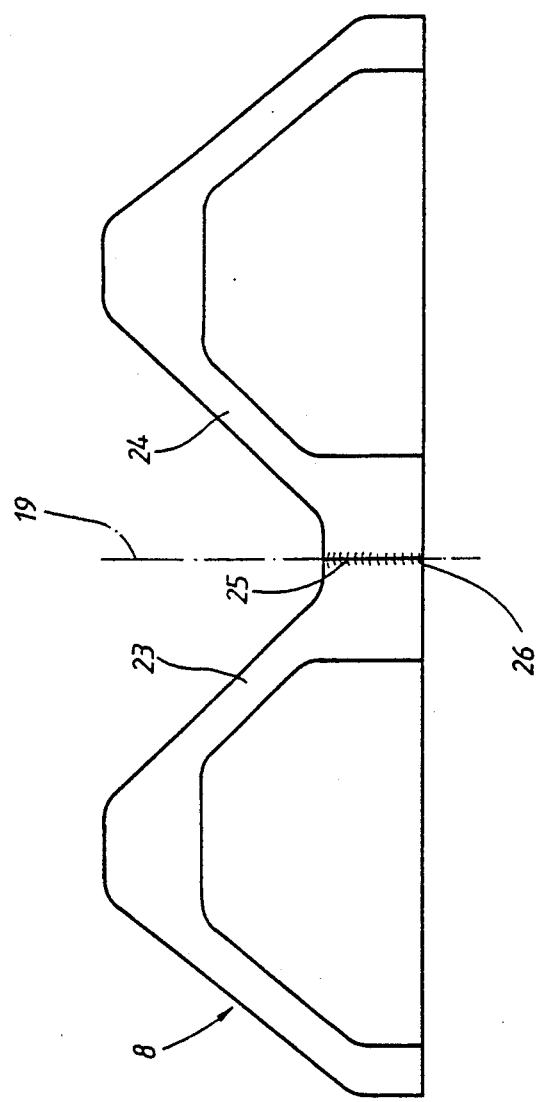

FRONT SECTION FOR A MOTOR VEHICLE, ESPECIALLY A PASSENGER MOTOR VEHICLE

BACKGROUND AND SUMMARY OF THE INVENTION

The present invention relates to a front section for a motor vehicle, especially passenger motor vehicle, with two longitudinal bearers provided on both sides at a distance to the center longitudinal axis of the vehicle and with one fork bearer each constructed as hollow profile and connecting the longitudinal bearers with a front end wall (firewall) of the passenger cell.

The front section of a motor vehicle body has the task to absorb during normal driving operation the forces emanating from the wheel suspension without permanent deformation, and to absorb the energy occurring in case of an impact of the vehicle by deformation. The forces are thereby transmitted by way of the longitudinal bearer to the fork bearer, are split up by the latter and are further transmitted at suitable points of the vehicle. For that purpose, the fork bearer includes two arms which extend abutting at the end wall, on the one hand, from the longitudinal bearer to the inner tunnel wall and, on the other, from the longitudinal bearer to the front wall column. Additionally, the longitudinal bearer continues up to the sill beam in a third arm starting from the fork bearer abutting at the underfloor of the vehicle. As a result thereof, the force occurring in case of an impact is split up in an appropriate manner and is transmitted at different points of the vehicle (DE-OS 27 25 083). The fork bearer is fixed at the front side of the end wall by means of a welded connection and is also connected with the longitudinal bearer. By reason of the fork bearer constructed as hollow profile, the disadvantage results with the prior art construction that for the fastening thereof at the end wall a large number of individual parts are necessary and several longitudinal welding seams must be provided for the connection of the same.

The present invention is concerned with the task to so construct the aforementioned front section of a motor vehicle that it can be manufactured cost-favorably and rationally with a small number of parts, and that it offers a high degree of safety for the vehicle passengers in case of an impact.

The underlying problems are solved according to the present invention in that the end wall is divided horizontally into an upper part and into a lower part, in that the fork bearer is made of an upper shell and of a lower shell and in that a shell of the fork bearer is made in one piece with the lower part of the end wall.

The end wall now consists of an upper part and of a lower part, whereby the lower part forms at the same time a shell of the fork bearer consisting of an upper and of a lower shell. The upper shell as also the lower shell of the fork bearer can thereby be formed-on at the lower part of the end wall. This construction offers the significant advantage that for the formation of the fork bearer, exclusively the corresponding shell has to be emplaced and has to be connected with the shell formed-on at the end wall, for example, by a welding seam. By forming-on one shell at the end wall, on the one hand, a welding seam extending longitudinally over the end wall is economized and, on the other, a greater rigidity of the fork bearer and of the end wall is achieved. In addition to the greater safety resulting therefrom for the persons present in the passenger cell, also manufacturing costs are economized and, furthermore, the manufacturing time is reduced.

One advantageous embodiment according to the present invention provides that the end wall upper part is constructed in one piece with the upper shell of the fork bearer and the end wall lower part is constructed in one piece with the lower shell of the fork bearer. Additionally, provision may be made that the end wall upper part and the end wall lower part have different sheet metal thicknesses. The utilized sheet metal panels or plates can now be matched as regards their thickness to the required conditions resulting from an impact. Advantageously, the lower part of the end wall will thereby have a greater sheet metal thickness than the upper part because the lower part of the end wall has to absorb a greater amount of energy. The use of sheet metal panels or plates of different thicknesses has advantageously as a consequence a saving in weight because only those sheet metal parts have deliberately a greater sheet metal thickness which are exposed to higher deformations, which have to absorb the predominant part of the energy, and which partition the passenger cell with respect to the engine space.

In another embodiment of the present invention, provision is made advantageously that the end wall lower part with formed-on fork bearer shell is made of a left and of a right half which are joined in the longitudinal center axis of the vehicle. The half of the end wall lower part, which faces the oppositely directed traffic, has thereby advantageously a greater sheet metal thickness. As a result thereof, a different shape-change resistance of the entire end wall is achieved which entails advantages in case of an offset crash because the vehicle side facing the oppositely directed traffic has to absorb, as a rule, a greater amount of energy which is achieved by the reinforced construction of the corresponding end wall lower part. This construction also brings about a weight reduction of the entire end wall because the other half can be made of a sheet metal part with lesser thickness.

Furthermore, the present invention relates to a method for manufacturing a front section of the aforementioned type whereby the right end wall lower part with formed-on fork bearer is deep-drawn in one piece in pot shape in the form of a right and left half, the deep-drawn pot is subsequently split by a longitudinal cut into the right and the left half of the end wall lower part, subsequently the two halves are folded each through 90° about a vertical pivot axis and after the alignment into the final position, are joined together in the center longitudinal axis of the vehicle into the end wall, for example, are welded together, respectively, spot-welded together or the like.

This method for the manufacture of the end wall according to the present invention with formed-on fork bearer shell offers the significant advantage that a shape particularly suited for the deep-drawing, namely, a pot-shape can be used, in connection with which during the deep-drawing the material can continuously flow from the edge, from which results a uniform wall thickness, and in which small material losses as a result of sheet metal scraps occur. The pot resulting after the deep-drawing operation is divided by a longitudinal cut so that two top halves result which represent the end wall halves bulged out toward the front side. These halves, after they are folded apart each through 90° and after the bulged-out parts have been aligned in the direction toward the vehicle front side, are welded together at the center longitudinal axis of the vehicles, that is, at their mutually facing sides, into the end wall. This end wall formed by the pot halves includes at its top side the lower shell or the upper shell of the fork bearer. In addition to the advantage of the optimum utilization of the sheet metal panel or plating utilized during the deep-drawing, the method according to the present invention additionally entails the advantage that the tools for the deep-drawing installation have a simple shape and can therefore be manufactured cost-favorably.

In another embodiment according to the present invention, provision is made that the end wall lower part with formed-on fork bearer shell is constructed in the form of a left and a right half, whereby two right halves, respectively, two left halves each are deep-drawn into pot shape, and the deep-drawn pot is split by a longitudinal cut into the two right, respectively, two left halves of the end wall lower part and after the alignment into the final position, a right half and a left half are joined together in the center longitudinal axis of the vehicle.

In this method according to the present invention, the deep-drawn pot, unlike with the method described hereinabove, does not form a left and a right half of the end wall, but it forms two right or two left halves. Accordingly, two deep-drawing installations must be provided whereby the right halves of the end wall are manufactured with one deep-drawing installation and the left halves of the end wall are manufactured with the other deep-drawing installation. The manufacture of the two halves in different deep-drawing installations offers the advantage that different sheet metal panels, for example, with different thicknesses can be utilized for the halves and, as a result thereof, an end wall can be manufactured suitable for an offset crash. After the deep-drawing of the pots, the latter are also to be split by means of a longitudinal cut into two pot halves each, whereby the pot halves then represent the right or left end side halves which are to be connected with each other by a welded seam.

Provision may also be made according to the present invention that a right and a left half of an end wall with a predetermined sheet metal thickness are made by means of one first deep-drawing tool and also a right and a left end wall half, however, with a different wall thickness, are made by means of a second deep-drawing tool and after the dividing of the deep-drawn pots, for example, a thick right half is connected with a thin left half, and the thin right half with the thick left half into an end wall. The end walls resulting therefrom are suitable for the use in vehicles for right-hand traffic, respectively, left-hand traffic for the optimum energy absorption in case of an offset crash.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 8 is a plan view on an end wall in accordance with the present invention, assembled of the right and left half.

DETAILED DESCRIPTION OF THE DRAWINGS

Figure 1:
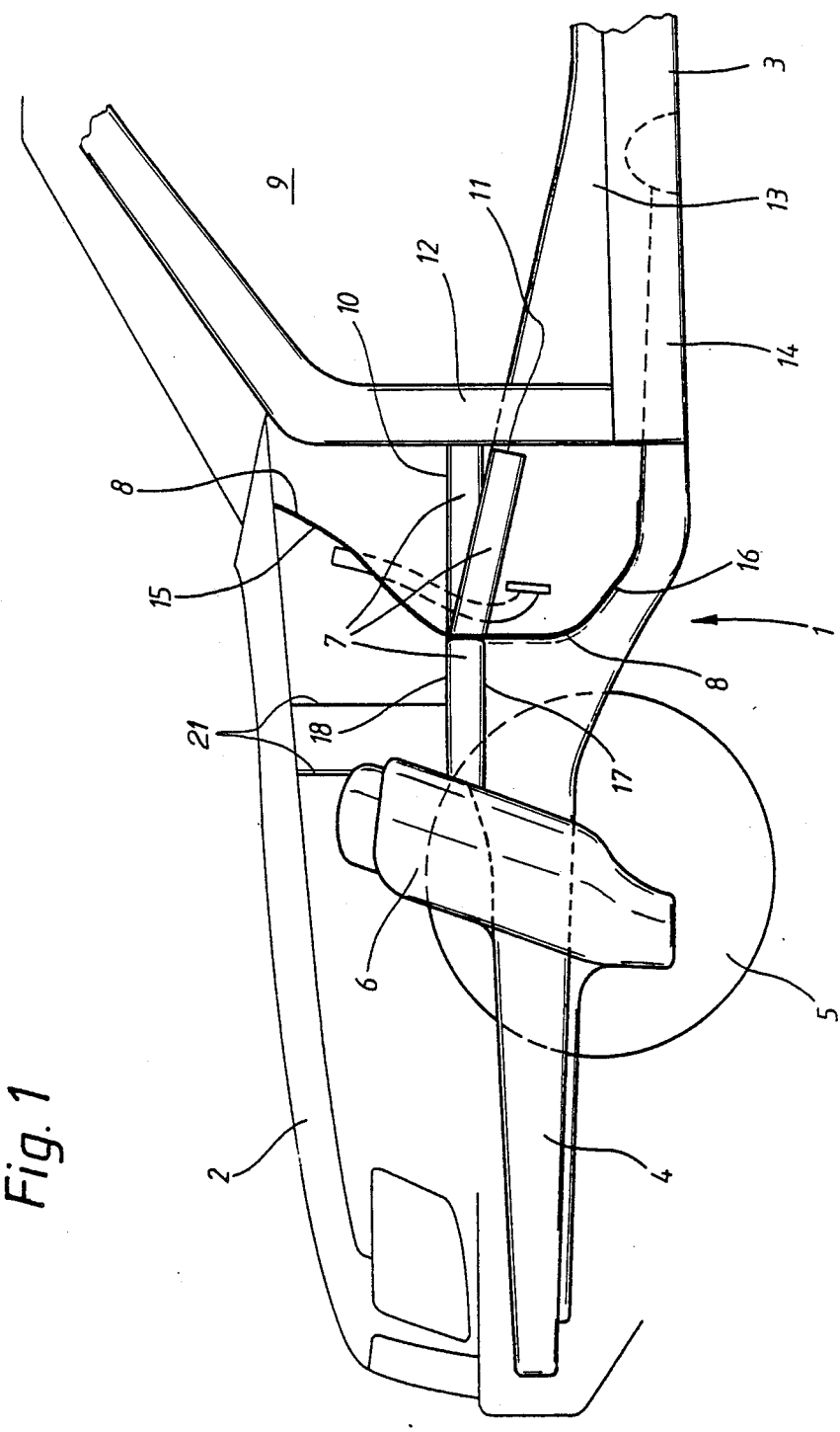
FIG. 1 is a schematic side elevational view of a front section of a motor vehicle in accordance with the present invention.

Referring now to the drawing wherein like reference numerals are used throughout the various views to designate like parts, and more particularly to FIG. 1, the front section generally designated by reference numeral 1 of a motor vehicle body is shown in this figure, whereby a longitudinal bearer 4 extends on each side of the vehicle 2 from the forward end thereof up to within the area of the sill beam 3; the front wheel 5 is fixed at the longitudinal bearer 4 by way of a wheel suspension 6. The longitudinal bearer 4 is supported by way of a fork bearer 7 at a front end wall 8 of a passenger cell 9. The fork bearer 7 includes arms 10 and 11 which extend about the end wall 8, and by way of which the longitudinal bearer 4 is supported, on the one hand, at a front wall column 12 by means of the arm 10 and, on the other, at the inner tunnel wall 13 by means of the arm 11. Additionally, the continuation of the longitudinal bearer 4 extending up to the sill beam 3 is constructed as further arm 14 so that the end wall 8 is embraced as by a three-legged structure. The end wall 8 is constructed two-partite with an upper part 15 and a lower part 16 whose horizontal separating line is located within the area of the fork bearer 7. The fork bearer 7 is constructed two-shelled, whereby an upper shell 18 extends over a lower shell 17.

Figure 2:
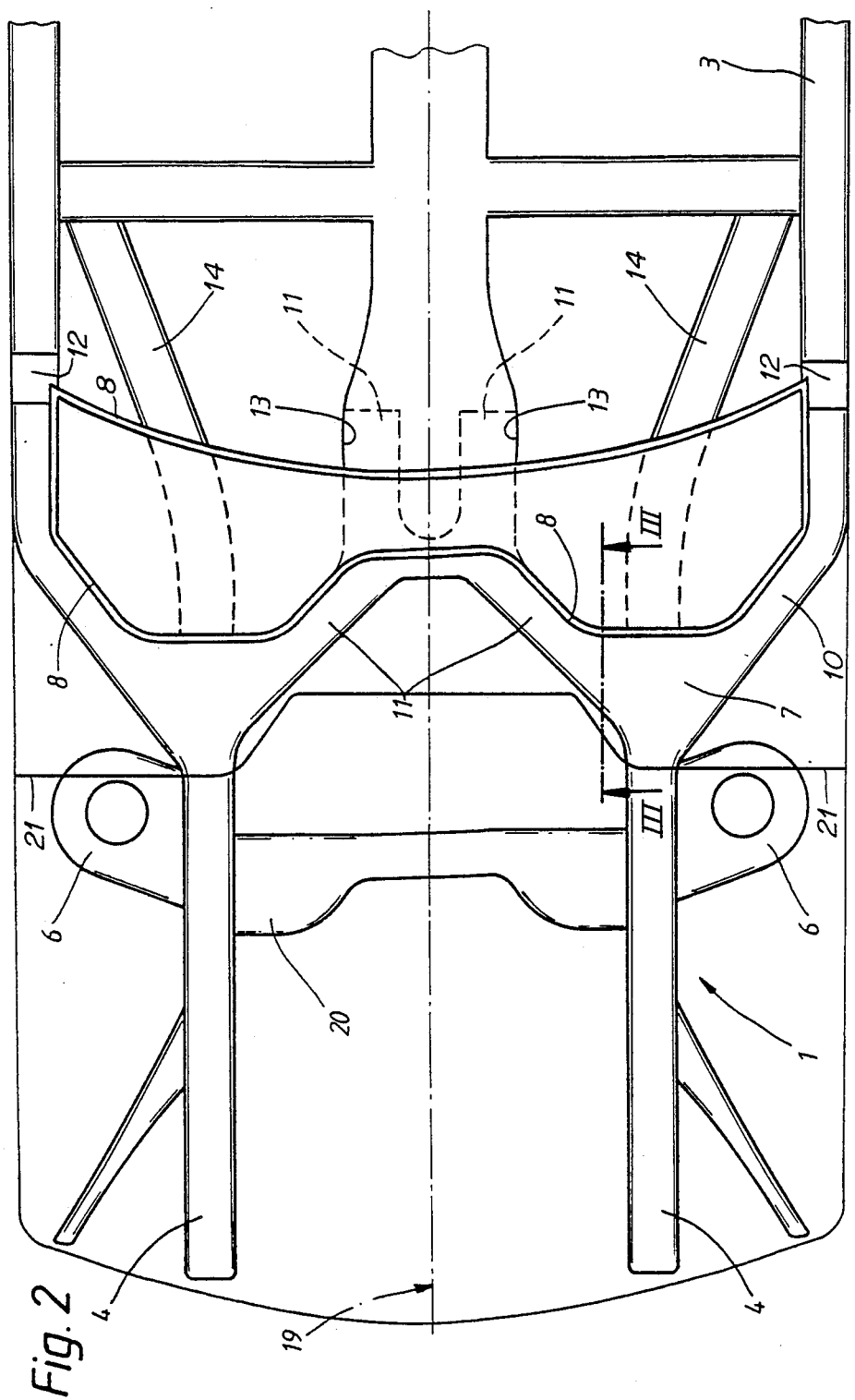
FIG. 2 is a schematic plan view on a motor vehicle front section in accordance with the present invention.

In the plan view of a front section of a vehicle body shown in FIG. 2, the structural parts such as longitudinal bearer 4, wheel suspension 6, fork bearer 7, end wall 8, and sill beam 3, are arranged mirror-image-like symmetrically to the center longitudinal axis 19. The longitudinal bearers 4 include the front axle 20 within the area of the wheel suspension 6. Furthermore, the arms 10 and 11 of the fork bearer 7 can be seen in this figure which are supported, on the one hand, at the front wall column 12 and, on the other, at the inner tunnel wall 13. Additionally, the arm 14 of the longitudinal bearer 4 can be seen in this figure which extends into the sill beam 3. Furthermore, the bulging of the end wall 8 can also be seen which points in an approximately conically truncated shape in the direction of the fork bearer 7.

Figure 3:
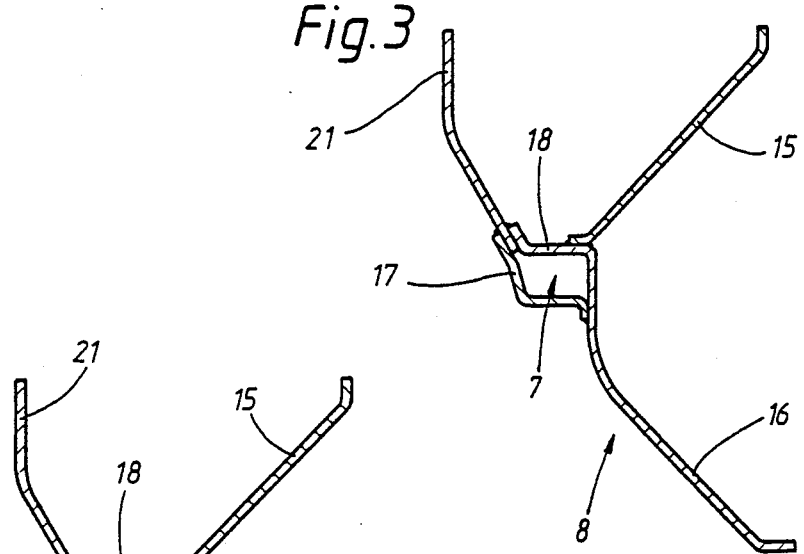
FIG. 3 is a schematic cross-sectional view of an end wall with emplaced fork bearer, taken along line III—III of FIG. 2.
Figure 4:
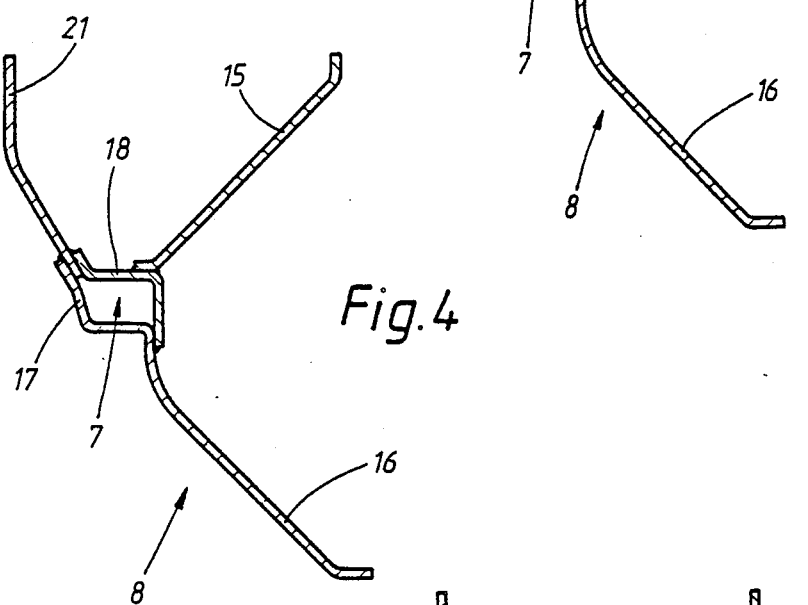
FIG. 4 is a schematic cross-sectional view of a modified embodiment of the end wall with emplaced fork bearer in accordance with the present invention, taken along line III—III of FIG. 2.
Figure 5:
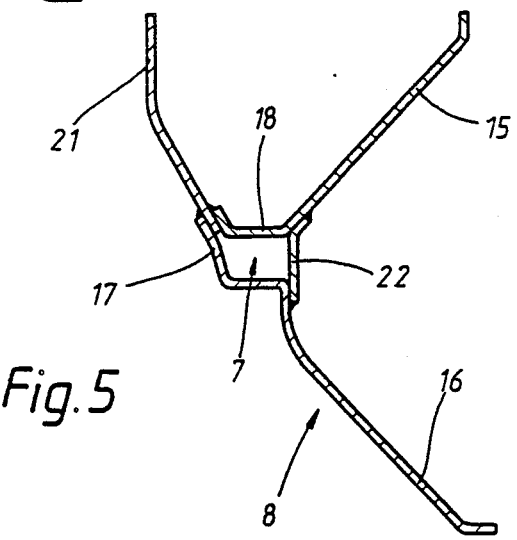
FIG. 5 is a schematic cross-sectional view of a still further modified embodiment of an end wall with emplaced fork bearer in accordance with the present invention.

The construction of the fork bearer 7 abutting at the end wall 8 can be seen from the schematic illustrations shown in FIGS. 3 to 5. The end wall 8 consists of an upper part 15 and of a lower part 16 and the fork bearer 7 includes an upper shell 18 and a lower shell 17. Furthermore, a transverse wall 21 pointing toward the end space is fixed at the fork bearer 7. In the embodiment illustrated in FIG. 3, the upper shell 18 of the fork bearer 7 is constructed in one piece with the lower part 16 of the end wall 8 and the other structural parts such as the upper part 15 and the lower shell 17 are fixed at the upper shell 18 of the fork bearer 7, for example, by way of a spot-welded connection.

In the embodiment illustrated in FIG. 4, the lower part 16 is constructed in one piece with the lower shell 17 of the fork bearer 7 and the other structural parts such as the upper part 15 and the upper shell 18 are connected with the lower shell 17.

FIG. 5 illustrates a further embodiment in which the upper part 15 is constructed in one piece with the upper shell 18 and the lower part 16 in one piece with the lower shell 17 and the fork bearer 7 is closed off by an additional wall 22. Also in this embodiment, the components are connected with each other by spot-welded seams.

Figure 6:
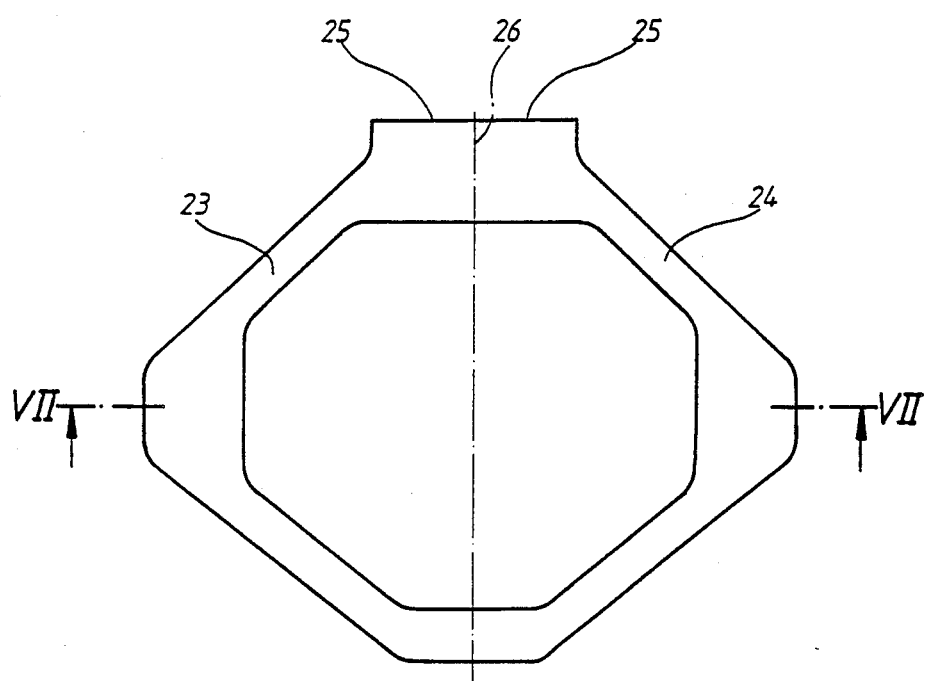
FIG. 6 is a plan view on a deep-drawn pot in accordance with the present invention, whose two pot halves form the right and left half of the end wall.

In the illustration shown in FIG. 6, the two halves 23 and 24 of the end wall 8 can be recognized which after the deep-drawing of the original sheet metal panel or plate form a pot-shape. This deep-drawn pot is separated along its symmetry line 26 into two halves which then form the two halves 23 and 24 of the end wall 8.

Figure 7:
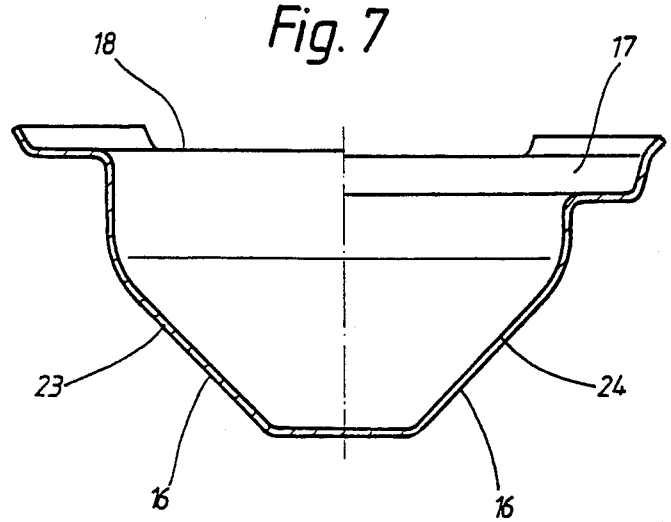
FIG. 7 is a cross-sectional view taken along line VII—VII of FIG. 6, whereby the two end wall halves are shown in different embodiments.

In the cross-sectional view shown in FIG. 7 through the two halves 23 and 24, two embodiments are shown whereby the left half 23 represents the lower part 16 made in one piece with the upper shell 18 of the fork bearer 7, and the right half 24 represents the lower part 16 made in one piece with the lower shell 17 of the fork bearer 7. After the deep-drawn pot has been split into the two halves 23 and 24 along the symmetry line 25, the two halves 23 and 24 are each pivoted about a vertical pivot axis 26 through 90° and abut at one another along the sides 25. The two halves 23 and 24, either in the first or in the second embodiment of FIG. 7, are welded together according to FIG. 8 along the mutually facing sides 25 and form the end wall 8 which is now mirror-image symmetrical to the center longitudinal axis 19 of the vehicle 2.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A front section for a motor vehicle, especially passenger motor vehicle, comprising two longitudinal bearer means provided at a distance to the center longitudinal axis of the vehicle, a fork bearer means constructed as hollow profile and connecting a respective longitudinal bearer means with an end wall means of the passenger cell, the end wall means being divided substantially horizontally into an upper part and a lower part, the fork bearer means being made of an upper shell means and a lower shell means, and at least one shell means of the fork bearer means being made in one piece with one of the two parts of the end wall means.

2. A front section according to claim 1, wherein the end wall upper part is made in one piece with the upper shell means of the fork bearer means and the end wall lower part is made in one piece with the lower shell means of the fork bearer means.

3. A front section according to claim 2, wherein the end wall upper part and the end wall lower part have differing sheet metal thicknesses.

4. A front section according to claim 3, wherein the end wall lower part with formed-on fork bearer shell means is made of a left and of a right half which are joined in the longitudinal center axis of the vehicle.

5. A front section according to claim 4, wherein the half of the end wall lower part which faces the traffic of the motor vehicle has a greater sheet metal thickness.

6. A front section according to claim 1, wherein the end wall upper part and the end wall lower part have differing sheet metal thicknesses.

7. A front section according to claim 1, wherein the end wall lower part with formed-on fork bearer shell means is made of a left and of a right half which are joined in the longitudinal center axis of the vehicle.

8. A front section according to claim 7, wherein the half of the end wall lower part which faces the traffic of the motor vehicle has a greater sheet metal thickness.

9. A method for making a front section of a motor vehicle, which includes two longitudinal bearers provided at a distance to the center longitudinal axis and one fork bearer each connecting a respective longitudinal bearer with an end wall and constructed as hollow profile and divided substantially horizontally into an upper part and a lower part, comprising the steps of making the end wall lower part with formed-on fork bearer shell of two halves symmetrical to the center axis of the vehicle by forming the two halves in unison as deep-drawn pot, subdividing the deep-drawn pot in a cutting plane perpendicular to the pot bottom so that the two halves are present separated from one another, and thereafter joining the two halves into the end wall lower part symmetrical to the center axis.

10. A method according to claim 9, wherein the two halves are joined together by welding.

11. A method according to claim 9, wherein the end wall lower part with formed-on fork bearer shell is made of halves symmetrical to the center axis of the vehicle which are each deep-drawn separately into pot shapes whereby two similar halves each are formed as deep-drawn pot which is divided in a cutting plane perpendicular to the pot bottom so that the two similar halves are present which are then joined with another half made in a similar manner into the end wall lower part symmetrical to the center axis.

* * * * *